United States Patent
Nagashima et al.

(10) Patent No.: US 10,553,369 B2
(45) Date of Patent: Feb. 4, 2020

(54) ELECTRIC STORAGE CELL, COVERING FILM AND ELECTRIC STORAGE MODULE

(71) Applicant: TAIYO YUDEN CO., LTD., Taito-ku, Tokyo (JP)

(72) Inventors: Takahiro Nagashima, Takasaki (JP); Katsunori Yokoshima, Takasaki (JP); Takayuki Tsuchiya, Takasaki (JP); Hiromi Sato, Takasaki (JP); Shinji Ishii, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/475,078

(22) Filed: Mar. 30, 2017

(65) Prior Publication Data
US 2018/0062135 A1 Mar. 1, 2018

(30) Foreign Application Priority Data
Aug. 30, 2016 (JP) ................... 2016-167666

(51) Int. Cl.
*H01G 11/80* (2013.01)
*H01M 2/02* (2006.01)

(52) U.S. Cl.
CPC ............ *H01G 11/80* (2013.01); *H01M 2/021* (2013.01); *H01M 2/0212* (2013.01); *H01M 2/0277* (2013.01); *H01M 2/0287* (2013.01)

(58) Field of Classification Search
CPC .. H01M 2/0287; H01M 2/0267; H01M 2/021; H01M 2/0212; H01M 2/0285; H01M 2/1061; H01M 2/12; H01G 11/78; H01G 11/80
See application file for complete search history.

(56) References Cited

U.S. PATENT DOCUMENTS

| | | | |
|---|---|---|---|
| 2005/0158622 A1* | 7/2005 | Mizuta ..................... | H01G 9/08 429/185 |
| 2006/0051658 A1* | 3/2006 | Otohata ................ | H01M 2/021 429/53 |
| 2012/0183840 A1* | 7/2012 | Lee ..................... | H01M 2/1077 429/158 |

FOREIGN PATENT DOCUMENTS

| JP | 2005203262 A | | 7/2005 |
|---|---|---|---|
| KR | 20000025737 A | * | 5/2000 |

OTHER PUBLICATIONS

Machine Translation for KR-20000025737-A.*

* cited by examiner

*Primary Examiner* — Edu E. Enin-Okut
(74) *Attorney, Agent, or Firm* — Law Office of Katsuhiro Arai

(57) ABSTRACT

An electric storage cell has an electric storage element and a covering film package. The covering film package houses the electric storage element and includes: a metal layer having a first principle face on the electric storage element side and a second principle face on the opposite side of the first principle face, an internal resin layer laminated to the first principle face, and an external resin layer laminated to the second principle face, with a slit formed in the external resin layer; wherein the contact area further includes a non-seal area between the seal area and the electric storage element as viewed from above, wherein the seal area has a projecting area that penetrates into the non-seal area, and the slit is provided between the projecting area and the electric storage element as viewed from above.

8 Claims, 9 Drawing Sheets

ELECTRIC STORAGE CELL, COVERING FILM AND ELECTRIC STORAGE MODULE

BACKGROUND

Field of the Invention

The present invention relates to an electric storage cell constituted by an electric storage element sealed with covering film, a covering film, and an electric storage module comprising a stack of such electric storage cells.

Description of the Related Art

Film-sealed batteries, which are electric storage elements sealed with covering film, are widely used in recent years. Film-sealed batteries are subject to rising pressure inside the battery due to generation of gaseous species as a result of electrolysis of the electrolyte medium, if the battery control circuit fails for some reason and abnormal voltage is applied as a result, or if the ambient temperature becomes abnormally high for some reason, while the battery is in use. As their internal pressure rises, film-sealed batteries will eventually experience a rupture of exterior material and gas will erupt from the ruptured area; however, it is not predictable where the rupture may occur, and depending on the location of rupture, surrounding equipment, etc., may be negatively affected.

To solve this problem, a configuration is disclosed in Patent Literature 1, for example, which involves a covering film whose seal part has a peninsula-shaped projected fusing part, so that when the covering film package expands and the projected fusing part peels, a through hole will be formed to serve as a pressure release part. This way, the peel-off stress generated by expansion of the film can be concentrated onto the projected fusing part to facilitate the progress of its peeling, thereby facilitating the release of the pressure caused by expansion of the package.

Background Art Literatures

[Patent Literature 1] Japanese Patent Laid-open No. 2005-203262

SUMMARY

According to the configuration in Patent Literature 1, however, the narrow seal width at the through hole and projected fusing part may affect long-term reliability, in that moisture may permeate in through the fusing resin layer. Besides the configuration described in Patent Literature 1, there are other configurations designed to release the internal pressure by causing a projection to break through the expanded covering film; however, they are costly because, among other reasons, a component that serves as this projection must be provided on each device. Also, handling of such device requires attention because a projection is permanently present on it.

In light of the aforementioned situations, an object of the present invention is to provide a reliable electric storage cell, covering film, and electric storage module, which would allow for safe release of rising internal pressure in the event of abnormality.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, an electric storage cell pertaining to one mode of the present invention has an electric storage element and a covering film package.

The covering film package houses the electric storage element and comprises: a metal layer having a first principle face on the electric storage element side and a second principle face on the opposite side of the first principle face, an internal resin layer made of synthetic resin and laminated to the first principle face, and an external resin layer made of synthetic resin and laminated to the second principle face, with a slit formed in the external resin layer; wherein a seal area formed by the internal resin layers thermally fused to each other around the periphery of the electric storage element, and a non-seal area where the internal resin layers are contacting each other between the seal area and the electric storage element, are provided, the seal area has a projecting area that projects toward the electric storage element, and the slit is provided between the projecting area and the electric storage element.

According to this configuration, a rise in the internal pressure of the electric storage cell due to an abnormality of the electric storage cell generates a stress that tries to separate the covering film package, and this stress concentrates on the stress concentration area corresponding to the non-seal area between the projecting area and the electric storage element. Then, as the internal pressure of the electric storage cell rises further, the covering film package expands in the stress concentration area and the stress propagates to the slit. Next, the stress propagating to the slit causes the covering film package to break open through the slit, and the internal pressure of the electric storage cell is released as a result.

This means that, since the internal pressure is released where the slit is formed, safety is ensured as pressure release from a part other than the slit can be prevented. Also, in a normal state (when no abnormality is present in the electric storage cell), moisture permeation into the housing space is prevented by the metal layer, and consequently reliability of the electric storage cell can be ensured.

Of the boundaries between the projecting area and the non-seal area, the boundary closest to the electric storage element may be parallel with the longitudinal direction of the slit.

According to this configuration, the release pressure at which the internal pressure of the electric storage cell is released can be controlled to a desired level by adjusting the distance from the boundary closest to the electric storage element, between the projecting area and the non-seal area, to the slit.

The slit may have a depth of 0 μm or more but no more than 15 μm, measured as the distance from the bottom of the slit in the external resin layer to the second principle face.

Under the present invention, it is sufficient for the slit to have the aforementioned depth in the external resin layer and the slit need not reach the metal layer. This way, corrosion of the metal layer is prevented even when the electric storage cell is used in a corrosive environment.

The internal resin layer may be made of non-oriented cast polypropylene or polyethylene, and the external resin layer may be made of at least one of polyethylene terephthalate and nylon.

To achieve the aforementioned object, a covering film pertaining to one mode of the present invention houses an electric storage element and comprises: a metal layer having a first principle face on the electric storage element side and a second principle face on the opposite side of the first principle face, an internal resin layer made of synthetic resin and laminated to the first principle face, and an external resin layer made of synthetic resin and laminated to the second principle face, with a slit formed in the external resin layer; wherein a seal area formed by the internal resin layers thermally fused to each other around the periphery of the electric storage element, and a non-seal area where the internal resin layers are contacting each other between the seal area and the electric storage element, are provided, the seal area has a projecting area that projects toward the electric storage element, and the slit is provided between the projecting area and the electric storage element.

By covering the storage element with the covering film having the aforementioned configuration, a reliable electric storage cell can be produced which would allow its rising internal pressure to be released safely in the event of abnormality (if the package expands uniformly, it is difficult to predict the location of a point of destruction of the covering film and the release pressure of destruction of the covering film).

To achieve the aforementioned object, an electric storage module pertaining to one mode of the present invention represents an electric storage module constituted by multiple electric storage cells that are stacked on top of each other.

The electric storage cells each have an electric storage element and a covering film package.

The covering film package houses the electric storage element and comprises: a metal layer having a first principle face on the electric storage element side and a second principle face on the opposite side of the first principle face, an internal resin layer made of synthetic resin and laminated to the first principle face, and an external resin layer made of synthetic resin and laminated to the second principle face, with a slit formed in the external resin layer; wherein a seal area formed by the internal resin layers thermally fused to each other around the periphery of the electric storage element, and a non-seal area where the internal resin layers are contacting each other between the seal area and the electric storage element, are provided, the seal area has a projecting area that projects toward the electric storage element, and the slit is provided between the projecting area and the electric storage element.

The covering film package may have contact areas where the internal resin layers are contacting each other around the periphery of the electric storage element, and the slit is formed in a location corresponding to, of the contact areas of each electric storage cell, the one facing a contact area of the adjacent electric storage cell.

According to this configuration, by providing a leakage-countermeasure component (sponge or other absorbent member) in the aforementioned location, this leakage-countermeasure component applied commonly to the adjacent electric storage cells can be used, in the event that the rising internal pressure of the electric storage cell due to its abnormality causes the electrolyte to leak from the slit, to absorb the electrolyte.

If slits are formed near a back-to-back connection part of the adjacent electric storage cells, a leakage-countermeasure for leakage of the electrolyte must be provided for each cell; if the slits are formed to face in the same direction, a leakage-countermeasure component must be provided for each cell based on a different structure.

This means that, by providing slits in the aforementioned locations, an electric storage module that can address leakage of electrolyte from the slits, should it occur, without complicating the apparatus configuration and also at low cost, can be provided.

As described above, a reliable electric storage cell, covering film, and electric storage module, which would allow for safe release of rising internal pressure in the event of abnormality, can be provided according to the present invention.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
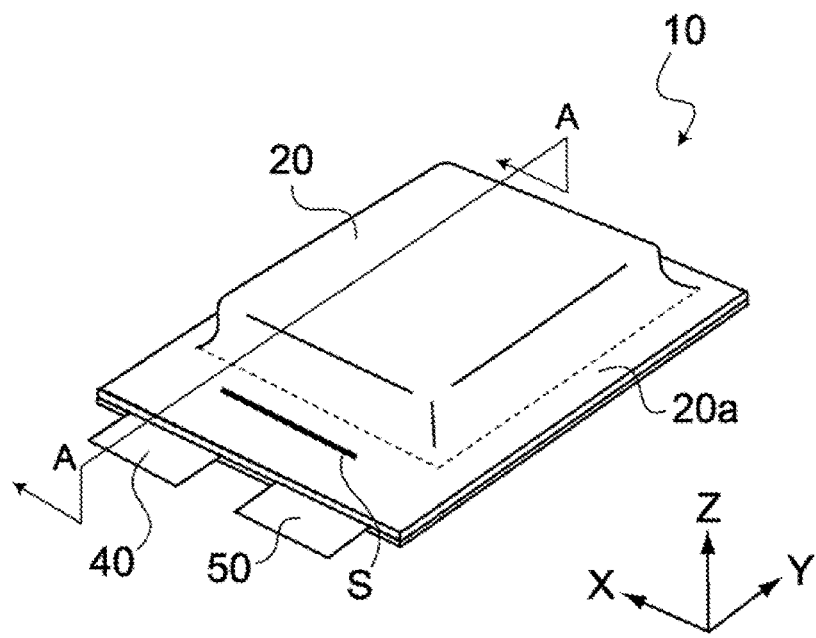
FIG. 1 is a perspective view of an electric storage cell pertaining to an embodiment of the present invention.

10—Electric storage cell
20—Covering film
20a—Contact area
20b—Element housing part
25—Metal layer
25a—First principle face 25b—Second principle face
26—Internal resin layer
27—External resin layer
30—Electric storage element
100—Electric storage module
E1—Seal area
E2—Non-seal area
E3—Projecting area
B1, B2, B3, B4, B5, B6—Boundary
P1—Bottom of the slit
S—Slit

DETAILED DESCRIPTION OF EMBODIMENTS

An embodiment of the present invention is explained below by referring to the drawings.

[Structure of Electric Storage Cell]

Figure 2:
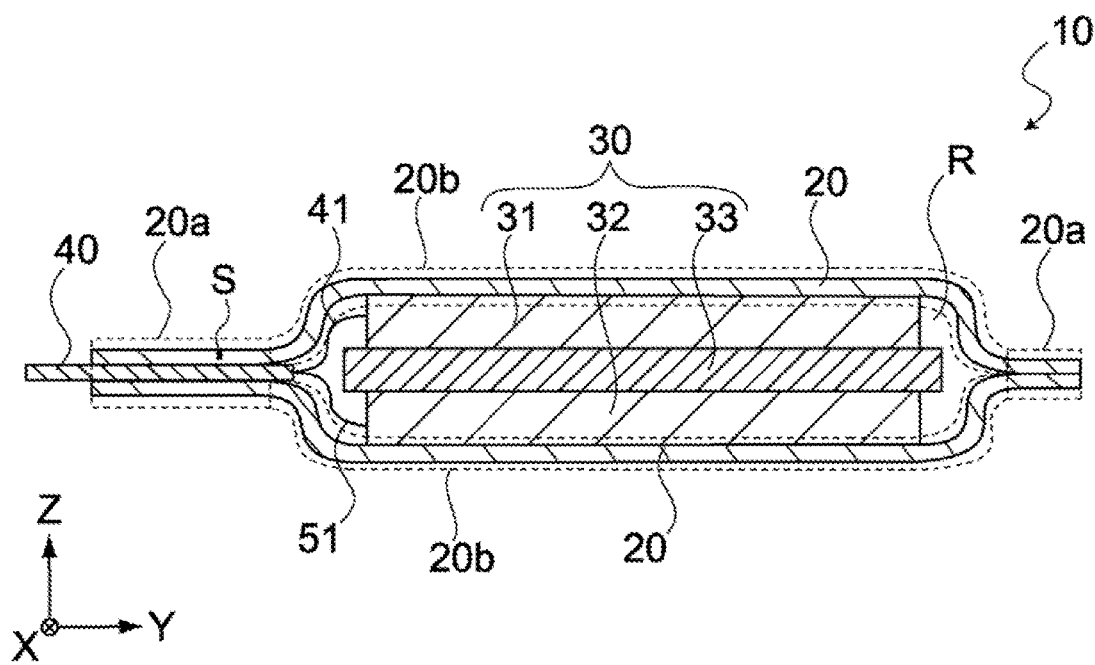
FIG. 2 is a cross sectional view of the electric storage cell pertaining to the embodiment of the present invention.

FIG. 1 is a perspective view of an electric storage cell 10 pertaining to this embodiment, while FIG. 2 is a cross sectional view of the electric storage cell 10 in FIG. 1 along line A-A. In the figures below, the X direction, Y direction and Z direction represent three directions that are orthogonal to each other.

As shown in FIGS. 1 and 2, the electric storage cell 10 has covering films 20, an electric storage element 30, a positive electrode terminal 40, and a negative electrode terminal 50.

In the electric storage cell 10, the covering film package constituted by the two covering films 20 forms a housing space R, and the electric storage element 30 is housed in the housing space R. The two covering films 20 are sealed around the periphery of the electric storage element 30, and the covering film package has contact areas 20a where the two covering films 20 contact each other, and an element housing part 20b where the electric storage element 30 is housed. The contact areas 20a and element housing part 20b will be described later.

The thickness of the electric storage cell 10 in this embodiment is not limited in any way, but it may be 12 mm or less, for example. This way, the operations and effects achieved by the formation of the slit S and projecting area E3 in the electric storage cell 10, as explained later, will become more significant.

As shown in FIG. 2, the electric storage element 30 has a positive electrode 31, a negative electrode 32, and a separator 33. The positive electrode 31 and negative electrode 32 face each other with the separator 33 in between, and are housed in the housing space R.

The positive electrode 31 functions as the positive electrode of the electric storage element 30. The positive electrode 31 may be made of a positive electrode material that contains positive electrode active material, binder, etc. The positive electrode active material may be activated carbon, for example. The positive electrode active material may be changed as deemed appropriate according to the type of the electric storage cell 10.

The negative electrode 32 functions as the negative electrode of the electric storage element 30. The negative electrode 32 may be made of a negative electrode material that contains negative electrode active material, binder, etc. The negative electrode active material may be carbon material, for example. The negative electrode active material may be changed as deemed appropriate according to the type of the electric storage cell 10.

The separator 33 is provided between the positive electrode 31 and the negative electrode 32, to allow the electrolyte to pass through it and also prevent (insulate) the positive electrode 31 and the negative electrode 32 from contacting each other. The separator 33 may be a woven fabric, non-woven fabric, synthetic microporous resin membrane, etc.

While one positive electrode 31 and one negative electrode 32 are provided in FIG. 2, multiple positive electrodes and multiple negative electrodes can be provided. In this case, the multiple positive electrodes 31 and multiple negative electrodes 32 may be stacked together alternately, with separators 33 in between. Also, the electric storage element 30 may be constituted by rolling a laminate comprising a positive electrode 31, a negative electrode 32, and a separator 33, into a roll.

The type of electric storage element 30 is not limited in any way, and it may be a lithium ion capacitor, lithium ion battery, electrical double-layer capacitor, etc. Together with the electric storage element 30, electrolyte is housed in the housing space R. This electrolyte is a solution that contains $SBP-BF_4$ (spirobipyrrolidinium tetrafluoroborate) or the like, for example, as a solute, and any electrolyte may be selected according to the type of the electric storage element 30.

The positive electrode terminal 40 is an external terminal of the positive electrode 31. As shown in FIG. 2, the positive electrode terminal 40 is electrically connected to the positive electrode 31 via positive electrode wiring 41, being routed between the two covering films 20 in the contact area 20a and led out from the interior to the exterior of the housing space R. The positive electrode terminal 40 may be a foil or wire made of conductive material.

The negative electrode terminal 50 is an external terminal of the negative electrode 32. The negative electrode terminal 50 is electrically connected to the negative electrode 32 via a negative electrode wiring 51, being routed between the two covering films 20 in the contact area 20a and led out from the interior to the exterior of the housing space R. The negative electrode terminal 50 may be a foil or wire made of conductive material.

As described above, the electric storage cell 10 has the contact areas 20a and the element housing part 20b. The contact areas 20a are where the two covering films 20 contact each other, while the element housing part 20b, enclosed by the contact areas 20a, is where the electric storage element 30 is housed.

Figure 3:
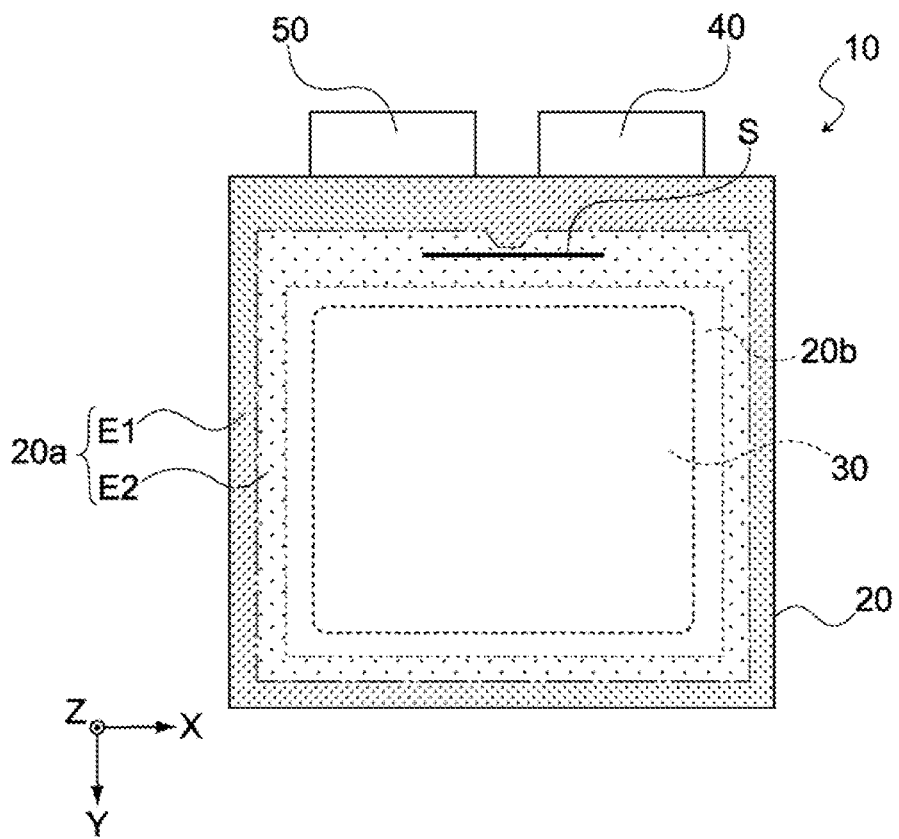
FIG. 3 is a plan view of the electric storage cell pertaining to the embodiment of the present invention.

FIG. 3 is a schematic view of the electric storage cell 10 as viewed from the Z direction. As shown in this figure, the contact areas 20a each have a seal area E1 and a non-seal area E2. The width of the contact area 20a may be anywhere from around several millimeters to several tens of millimeters, for example.

The seal area E1 is an area formed by the covering films 20 thermally fused to each other, and provided around the periphery of the covering films 20.

The non-seal area E2 is an area where the covering films 20 are in contact with each other as a result of the thermal fusion in the seal area E1, and provided between the seal area E1 and the element housing part 20b. The width of the seal area E1 and non-seal area E2 may be anywhere from around several millimeters to several tens of millimeters, for example.

[Configuration of Covering Film]

Figure 4:
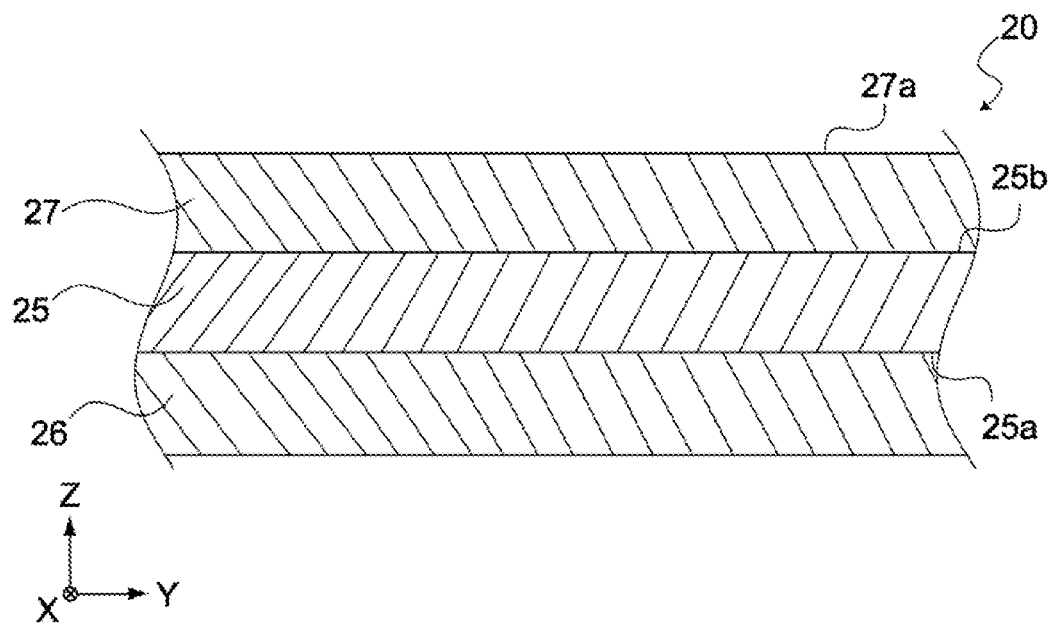
FIG. 4 is a cross sectional view of a covering film provided in an electric storage cell pertaining to an embodiment of the present invention.

FIG. 4 is a cross sectional view of each covering film 20. As shown in this figure, the covering film 20 is constituted by a metal layer 25, an internal resin layer 26, and an external resin layer 27.

The metal layer 25 is a layer made of foil-like metal, and has a function to prevent moisture in air from permeating through it. As shown in FIG. 4, the metal layer 25 has a first principle face 25a, and a second principle face 25b on the opposite side thereof.

The metal layer 25 may be a metal foil made of aluminum, for example. Besides the foregoing, the metal layer 25 may also be a foil of copper, nickel, stainless steel, etc. Preferably the thickness of the metal layer 25 pertaining to this embodiment is around several tens of micrometers.

The internal resin layer 26 is laminated to the first principle face 25a to constitute the inner periphery face of the housing space R, covering and insulating the metal layer 25.

The internal resin layer 26 is made of synthetic resin, such as non-oriented cast polypropylene (CPP) or polyethylene, for example. Besides the foregoing, the internal resin layer 26 may be made of acid-modified polyethylene, polyphenylene sulfide, polyethylene terephthalate, polyamide, ethylene-vinyl acetate copolymer, or the like. Also, the internal resin layer 26 may be constituted by multiple synthetic resin layers laminated together.

The external resin layer 27 is laminated to the second principle face 25b to constitute the surface 27a of the electric storage cell 10, covering and protecting the metal layer 25.

The external resin layer 27 is made of synthetic resin, and it may be made of at least one of polyethylene terephthalate and nylon, for example. Also, the external resin layer 27 may have a two-layer structure consisting of a nylon layer made of oriented nylon, etc., and a polyethylene terephthalate layer laminated to it. Besides the foregoing, the external resin layer 27 may be made of bi-axially oriented polypropylene, polyimide, polycarbonate, or the like.

In this embodiment, the housing space R is formed by the covering film package constituted as above, where the two covering films 20 are facing each other with the electric storage element 30 in between and sealed in a seal area E1 of the contact areas 20a which also include a non-seal area E2. In the seal area E1, the internal resin layers 26 of the two covering films 20 are thermally fused to each other. The covering films 20 are each positioned in such a way that the internal resin layer 26 faces the housing space R side (inside) and the external resin layer 27 constitutes the surface 27a side (outside).

The covering films 20 are used in a condition where they maintain flexibility, and may be formed in a manner being curved at the peripheries of the electric storage element 30 according to the shape of the electric storage element 30, as shown in FIG. 2. Also, the covering films 20 may be used in a condition where they have been pre-formed to such shape by means of embossing. A slit S is formed in one of the two covering films 20.

[Configuration of Projecting Area]

Figure 5:
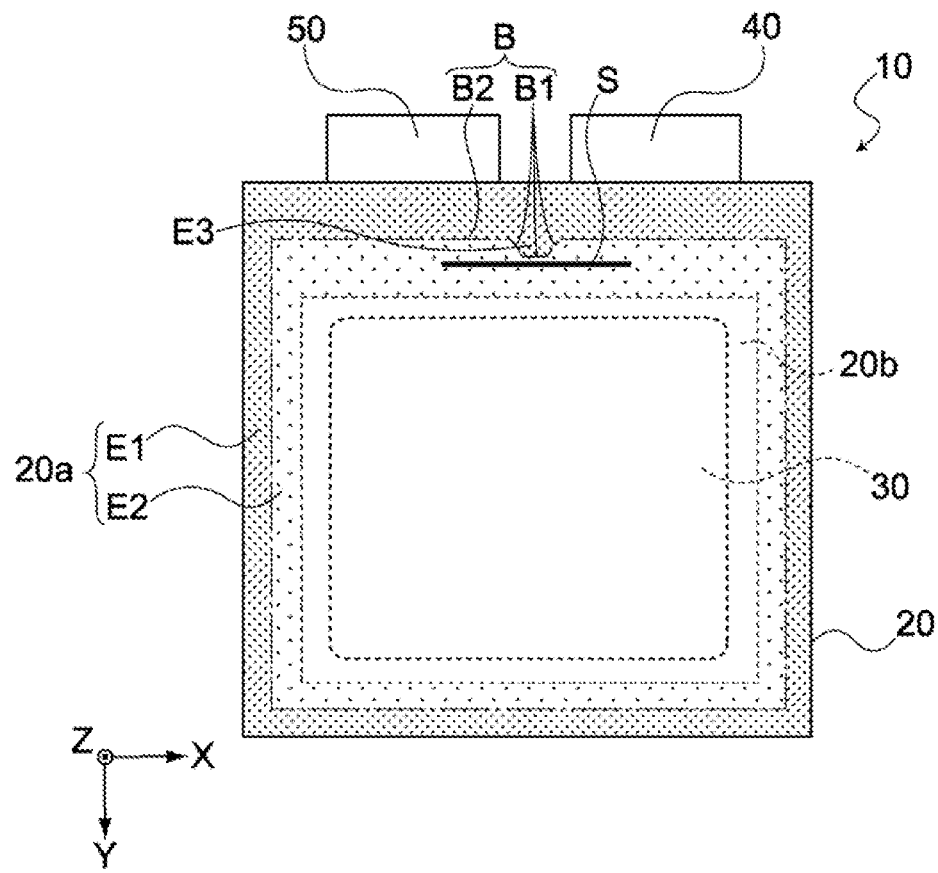
FIG. 5 is a plan view of the electric storage cell illustrated in FIG. 3.

FIG. 5 is a schematic view of the electric storage cell 10 as viewed from the Z direction. The seal area E1 pertaining to this embodiment has a projecting area E3 that projects toward the electric storage element 30, as shown in FIG. 5. This provides a configuration where the seal area E1 penetrates into the non-seal area E2, and the projecting area E3 becomes the closest part of the seal area E1 to the electric storage element 30.

Because the seal area E1 has the projecting area E3, the boundary B between the seal area E1 and the non-seal area E2 comprises a boundary B1 and a boundary B2, as shown in FIG. 5. The boundary B1 represents a boundary between the projecting area E3 and the non-seal area E2, and the boundary B2, which surrounds the non-seal area E2, represents a boundary between the seal area E1 and the non-seal area E2, excluding the boundary B1.

Figure 6:
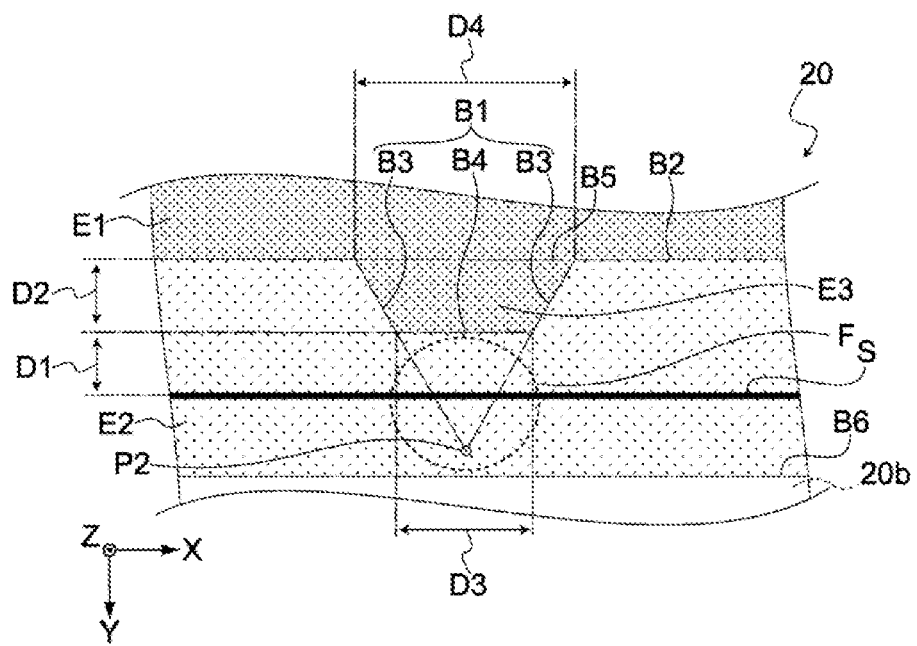
FIG. 6 is an enlarged view, from one direction, of the projecting area provided in the electric storage cell illustrated in FIG. 5.

FIG. 6 is an enlarged view of the projecting area E3 as viewed from the Z direction. The projecting area E3 pertaining to this embodiment has a trapezoid shape, as shown in this figure. In this embodiment, the boundary B1 between the projecting area E3 and non-seal area E2 pertaining to this embodiment comprises a boundary B3 and a boundary B4, as shown in this figure.

The boundaries B3 connect to the boundary B2 and boundary B4. The boundary B4 is positioned on the electric storage element 30 (slit S) side of the boundaries B3, and provided in parallel with the longitudinal direction of the slit S. The boundary B4 represents the closer, to the electric storage module 30, of the boundaries B3, B4 between the projecting area E3 and the non-seal area E2, as shown in FIG. 6.

Also, the non-seal area E2 pertaining to this embodiment has a stress concentration area F between the projecting area E3 and the element housing part 20b, as shown in FIG. 6. The stress concentration area F will be described later.

The distance D1 between the boundary B4 and the slit S, dimension D2 of the projecting area E3 in the Y direction (distance between the boundary B5 and the boundary B4), dimension D3 of the boundary B4 in the X direction, and dimension D4 of the boundary B5 between the projecting area E3 and the seal area E1 in the X direction, may be anywhere from around several millimeters to several tens of millimeters, for example.

The shape of the projecting area E3 pertaining to this embodiment is not limited to trapezoid as shown in FIG. 6, and it may be rectangle, semi-circle, triangle, or the like.

The position where the projecting area E3 is formed is not limited to the positions shown in FIGS. 5 and 6. For example, the projecting area E3 may project toward the electric storage element 30 from a part of the seal area E1 running orthogonal to the part of the seal area E1 where the positive electrode terminal 40 and negative electrode terminal 50 are provided (refer to FIG. 8). Or, it may project toward the electric storage element 30 from a part of the seal area E1 running parallel with the longitudinal direction of the part of the seal area E1 where the positive electrode terminal 40 and negative electrode terminal 50 are provided (refer to FIG. 9).

[Configuration of Slit]

Figure 7:
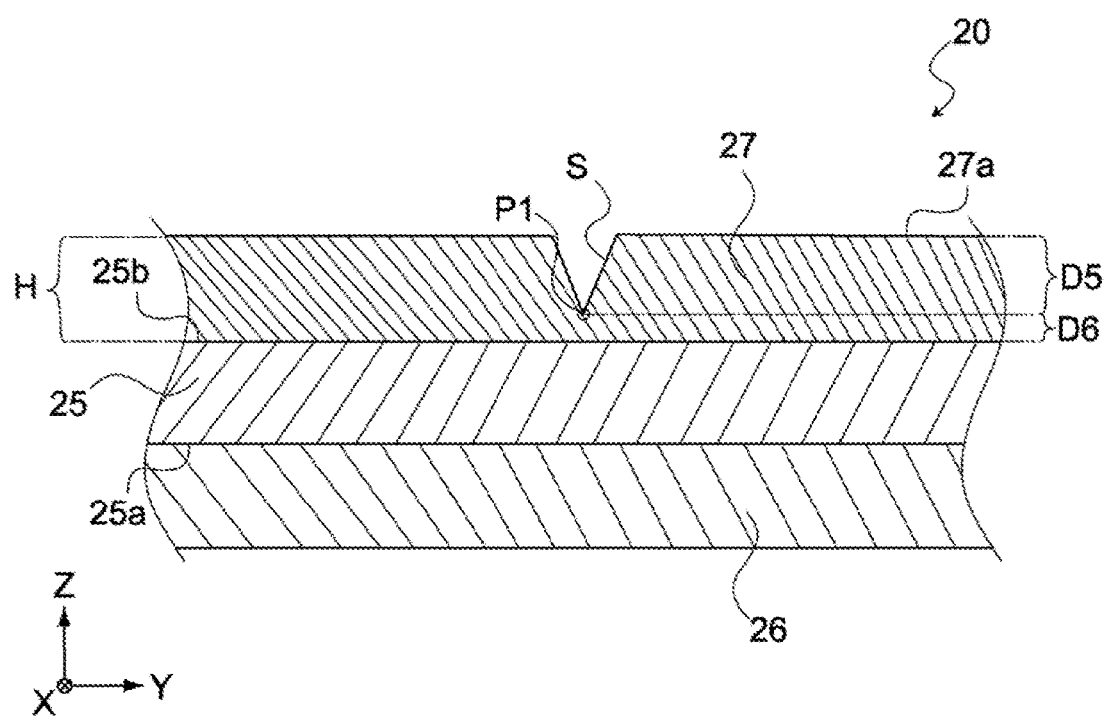
FIG. 7 is a cross sectional view of a covering film provided in an electric storage cell pertaining to an embodiment of the present invention.

FIG. 7 is a cross sectional view of the covering film 20 that includes a slit S. As shown in FIG. 7, the slit S is formed from the surface 27a of the external resin layer 27 to midway through the layer. As a result, the external resin layer 27 is partially separated by the slit S.

Preferably the depth D5 of the slit S is such that the metal layer 25 prevents moisture permeation in a normal state, but in the event of abnormality, the metal layer 25 would rupture quickly. To be specific, the depth may be 0 μm or more but no more than 5 μm, for example, measured as the distance D6 from the bottom P1 of the slit S in the external resin layer 27 to the second principle face 25b. It should be noted that the distance D6 is not limited to 0 μm or more but no more than 5 μm, and it may be 0 μm or more but no more than 15 μm, for example.

The slit S is provided between the projecting area E3 and the electric storage element 30, as shown in FIG. 5. As long as the slit S pertaining to this embodiment is provided between the projecting area E3 and the electric storage element 30, its extending direction is not limited in any way; however, preferably it is formed in parallel with the periphery of the seal area E1.

This way, when the covering film 20 expands due to an abnormality of the electric storage cell 10, the covering film 20 breaks open easily at the location where the slit S is formed. As a result, the release pressure at which the internal pressure of the electric storage cell 10 is released can be reduced. The dimension of the slit S in the longitudinal direction may be set to around several tens of millimeters, for example.

Figure 8:
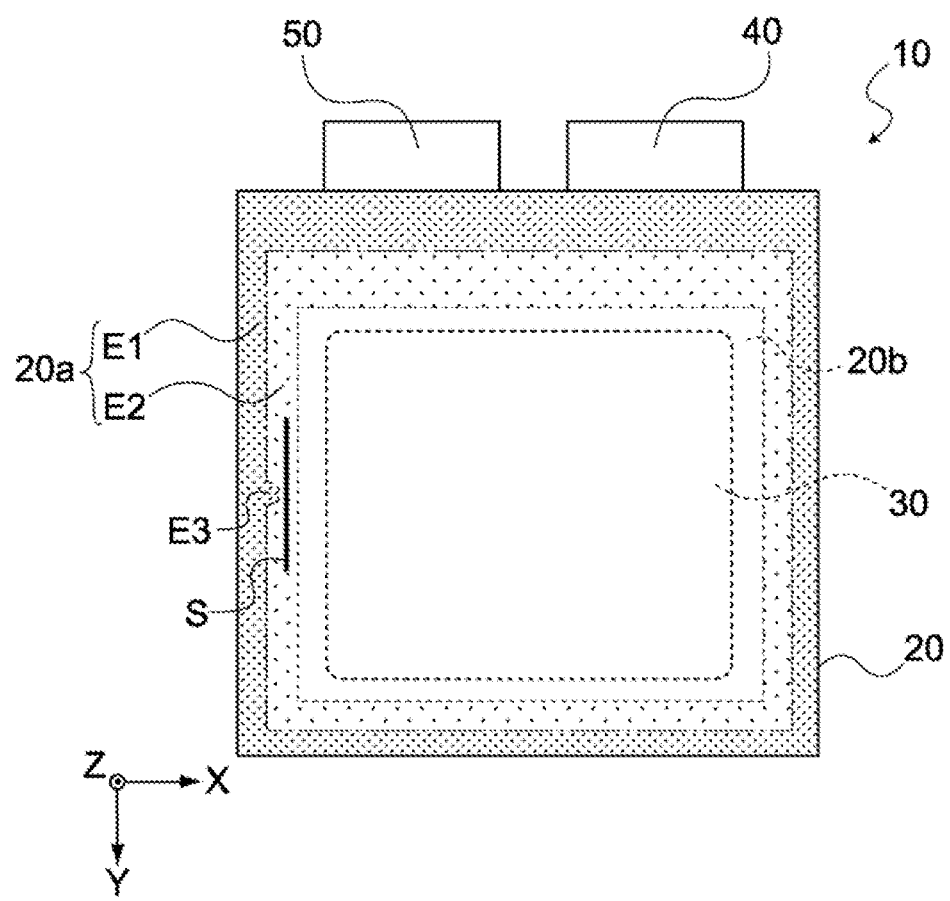
FIG. 8 is a plan view of an electric storage cell pertaining to another embodiment of the present invention.
Figure 9:
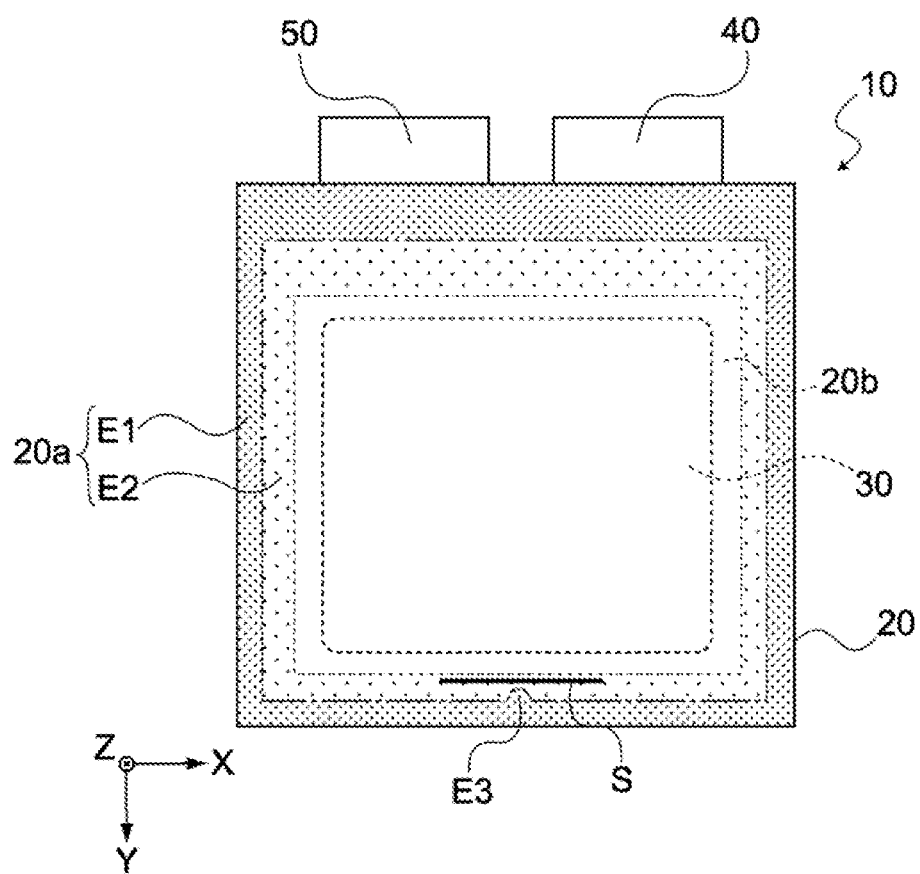
FIG. 9 is a plan view of an electric storage cell pertaining to still another embodiment of the present invention.

FIGS. 8 and 9 are each a schematic view showing the position where the slit S and projecting area E3 are formed. The slit S in this embodiment may be orthogonal to the longitudinal direction of the seal area E1 where the positive electrode terminal 40 and negative electrode terminal 50 are formed, as shown in FIG. 8, or it may be parallel with this longitudinal direction, as shown in FIG. 9.

[Operations of Slit and Projecting Area]

While the electric storage cell 10 is in use, the covering film 20 remains in the state shown in FIGS. 4 and 5 in a normal state (when no abnormality is present in the electric storage cell 30), or specifically when the internal pressure of the housing space R is within the allowable range. In this state, the slit S does not separate the metal layer 25, and therefore the metal layer 25 prevents moisture from permeating through the covering film 20.

On the other hand, if an abnormality occurs in the electric storage cell 10 while the electric storage cell 10 is in use and its internal pressure rises as a result, the covering film 20 expands. And, once the internal pressure of the electric storage cell 10 reaches or exceeds a certain level, the covering film 20 breaks open at the part where the slit S is formed. As a result, the internal pressure of the housing space R is released.

This means that, in this embodiment, the formation of the slit S in the covering film 20 allows the position at which the covering film 20 would break open, to be specified beforehand. If no slit S is provided, the weakest part of the covering film package, or specifically the seal area E1, will break open and the internal pressure will be released. In this case, there is no way of knowing which part of the seal area E1 formed over the entire periphery of the electric storage element 30, will break open.

Also, the release of the internal pressure in the event of abnormality occurs as a result of the covering film 20 breaking open, as described above. In other words, the release pressure at which the internal pressure of the housing space R is released after having risen due to an abnormality of the electric storage cell 10, can be adjusted by the strength of the covering film 20.

The strength of the covering film 20 can be adjusted by the thickness of the covering film 20, for example. In this case, the strength of the covering film 20 can be adjusted by the overall thickness of the covering film 20 including its metal layer 25, internal resin layer 26, and external resin layer 27. At any rate, it is sufficient that the internal pressure at which the covering film 20 breaks open at the slit S is lower than the internal pressure at which the seal area E1 breaks open.

In addition, it is also possible, in this embodiment, to adjust the release pressure at which the internal pressure of the housing space R is released after having risen due to an abnormality of the electric storage cell 10, by the position where the slit S is formed.

To be more specific, the electric storage cell 10 in this embodiment has a projecting area E3 that corresponds to where the seal area E1 penetrates into the non-seal area E2, as shown in FIGS. 5 and 6. Because of this, a rise in the internal pressure of the housing space R due to an abnormality of the electric storage cell 10 causes the stress that tries to separate the covering films 20 from each other (hereinafter referred to as "stress") to concentrate in the stress concentration area F.

Then, as the internal pressure of the housing space R rises further, the covering film 20 in the stress concentration area F expands from the boundary B6 between the element housing part 20b and the non-seal area E2, and the stress propagates to the slit S. And, this stress that has propagated to the slit S causes the covering film 20 to break open over the entire location where the slit S is formed. As a result, the internal pressure of the storage space R that has risen due to an abnormality of the electric storage cell 10 is released over a short period of time.

Accordingly, in this embodiment, the release pressure of the housing space R can be controlled to a desired level by adjusting the distance D1 between the boundary B4 and the slit S.

For example, shortening the distance D1 makes it easier for the stress to propagate to the slit S through the stress concentration area F. This means that the internal pressure of the housing space R becomes lower by the time the stress propagates to the slit S, which in turn means that the release pressure of the housing space R also becomes lower.

On the other hand, extending the distance D1 makes it more difficult for the stress to propagate to the slit S through the stress concentration area F. This means that the internal pressure of the housing space R needed before the stress propagates to the slit S becomes higher, which in turn means that the release pressure of the housing space R also becomes higher.

Also, in this embodiment, the release pressure at which the internal pressure of the housing space R is released after having risen due to an abnormality of the electric storage cell 10, can also be adjusted by the dimension D3 of the boundary B4.

For example, increasing the dimension D3 of the boundary B4 enlarges the stress concentration area F. This means that the stress concentration area F that must be expanded for the stress to propagate to the slit S becomes larger. Accordingly, the internal pressure of the housing space R becomes higher by the time the stress propagates to the slit S through the stress concentration area F. As a result, the release pressure of the housing space R also becomes higher.

On the other hand, decreasing the dimension D3 of the boundary B4 reduces the stress concentration area F. This means that the stress concentration area F that must be expanded for the stress to propagate to the slit S becomes smaller. Accordingly, the internal pressure of the housing space R needed before the stress propagates to the slit S through the stress concentration area F becomes lower. As a result, the release pressure of the housing space R also becomes lower.

In particular, the aforementioned operations achieved by making the dimension D3 of the boundary B4 smaller become significant when the projecting area E3 has a trapezoid shape as shown in FIG. 6 and the slit S is positioned on the projecting area E3 side of the point of intersection P2 of the lines extended from the two boundaries B3 corresponding to the non-parallel sides of the trapezoid, in the projecting direction (Y direction).

It can be concluded from the foregoing that, with the electric storage cell 10 pertaining to this embodiment, the release pressure at which the internal pressure of the housing space R is released can be reduced to levels lower than heretofore possible with conventional electric storage cells, by making the distance D1 shorter and the dimension D3 of the boundary B4 smaller. To be specific, the release pressure can be reduced to approx. 0.05 MPa with the electric storage cell 10.

With the electric storage cell 10 pertaining to this embodiment, the adjustability of the release pressure in the event of abnormality prevents the release pressure from becoming higher than a desired level even when the thickness of the electric storage cell 10 is relatively small. This way, release of internal pressure from a location other than the location where the slit S is formed, can be prevented.

Also, in this embodiment, as described above, the release pressure of the electric storage cell 10 can be adjusted to a desired level by adjusting the distance D1 between the boundary B4 and the slit S and the dimension D3 of the boundary B4, the depth D5 of the slit S does not have much bearing on the setting of the release pressure of the electric storage cell 10. As a result, the processing accuracy of the slit S can be relaxed more than what has been heretofore permitted and the productivity of electric storage cells 10 can be improved.

To be specific, it is sufficient for the depth D5 of the slit S in this embodiment to be such that the distance D6 between the bottom P1 of the slit S and the second principle face 25b of the metal layer 25 becomes 0 µm or more but no more than 15 µm, and it need not reach the metal layer 25. This way, corrosion of the metal layer 25 is prevented even when the electric storage cell 10 is used in a corrosive environment.

[Configuration of Electric Storage Module]

Figure 10:
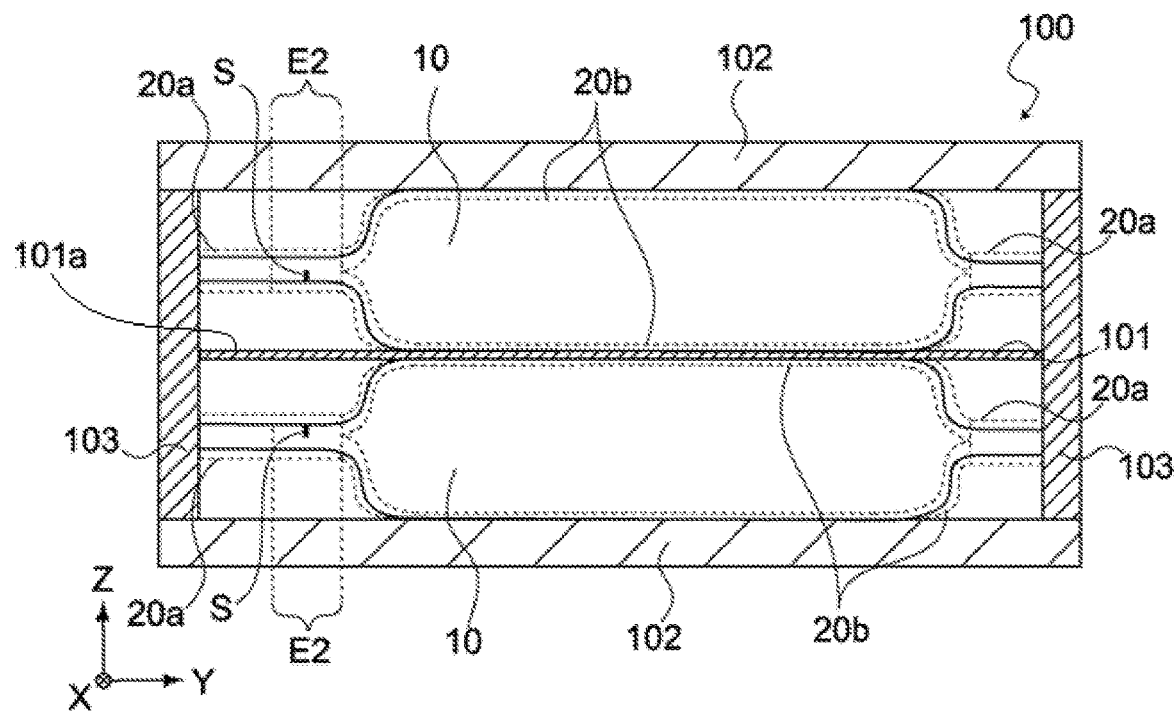
FIG. 10 is a schematic view of an electric storage module pertaining to an embodiment of the present invention.

An electric storage module can be constituted by stacking multiple electric storage cells 10 per this embodiment on top of each other. FIG. 10 is a schematic view of an electric storage module 100. The electric storage module 100 has multiple electric storage cells 10, heat conductive sheets 101, plates 102, and support members 103, as shown in this figure.

The multiple electric storage cells 10 are stacked together with the heat conductive sheets 101 in between, and supported by the support members 103. The number of electric storage cells 10 may be two or more. The positive electrode terminals 40 and negative electrode terminals 50 of the electric storage cells 10 may be connected between the electric storage cells 10 by wiring or terminals that are not illustrated. The plates 102 are stacked on the top face and bottom face of the multiple electric storage cells 10.

The electric storage module 100 is such that, as shown in FIG. 10, the slits S formed in the non-seal areas E2 ensure that the plates 102 will not prevent the internal resin layers 26 from expanding, and this makes it possible to release the internal pressure at a specified level.

Also, as shown in FIG. 10, the electric storage module 100 pertaining to this embodiment is such that each slit S is formed in a location of the contact areas 20a of each electric storage cell 10, where the contact areas 20a of the adjacent electric storage cells 10 face each other.

This means that, by providing a leakage-countermeasure component (sponge or other absorbent member) in the aforementioned location, this leakage-countermeasure component applied commonly to the adjacent electric storage cells 10 can be used (e.g., by shortening a part 101a of the heat conductive sheet in FIG. 10 to make a common space for accommodating the common leakage-coping component), in the event that the rising internal pressure of the electric storage cell 10 due to its abnormality is released and it causes the electrolyte to leak from the slit S, to absorb the electrolyte.

If slits S are formed near a back-to-back connection part of the adjacent electric storage cells 10, a leakage-countermeasure electrolyte must be provided for each cell; if the slits S are formed to face in the same direction, a leakage-countermeasure component must be provided for each cell based on a different structure.

This means that, by providing slits S in the aforementioned locations, an electric storage module 100 that can address leakage of electrolyte from the slits S, should it occur, without complicating the apparatus configuration and also at low cost, can be provided.

[Variation Examples]

Figure 11:
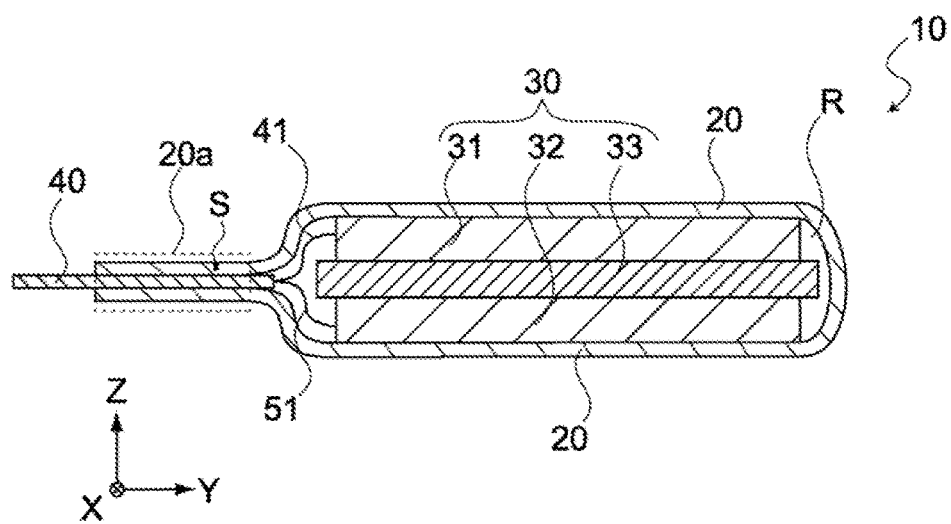
FIG. 11 is a cross sectional view of an electric storage cell pertaining to a variation example of the present invention.
Figure 12:
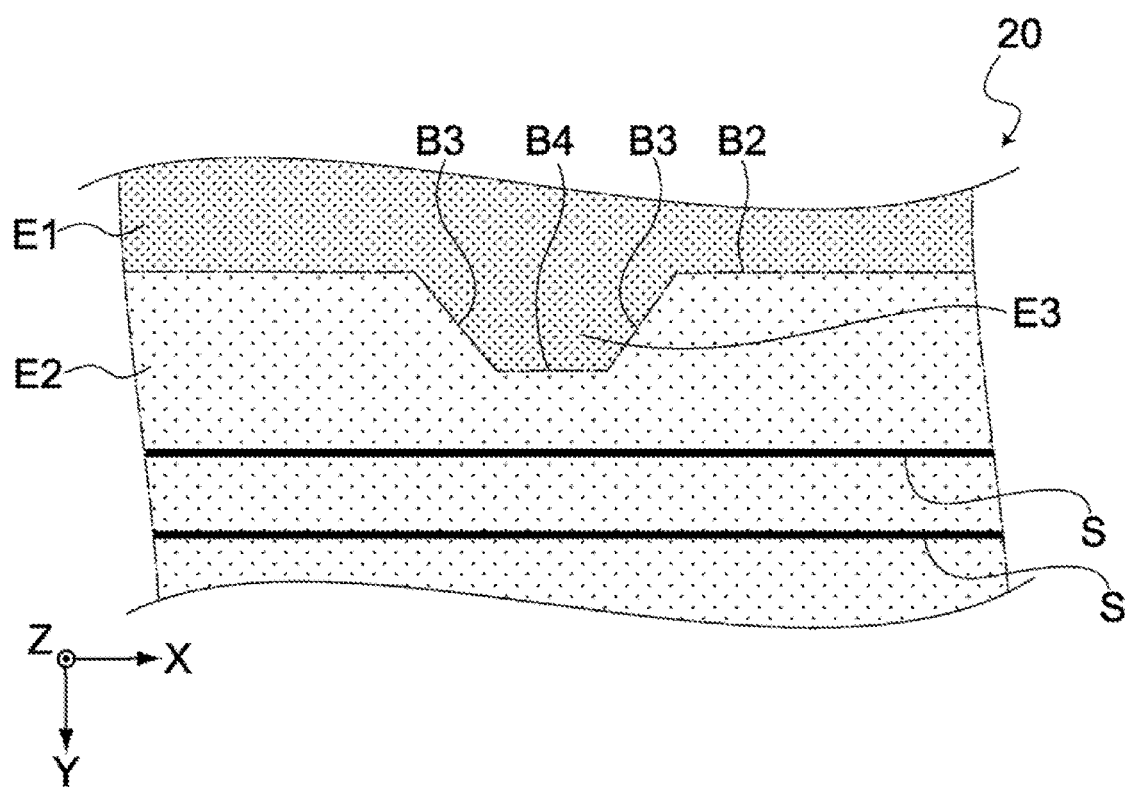
FIG. 12 is an enlarged view, from one direction, of the projecting area provided in an electric storage cell pertaining to another embodiment of the present invention.
Figure 13:
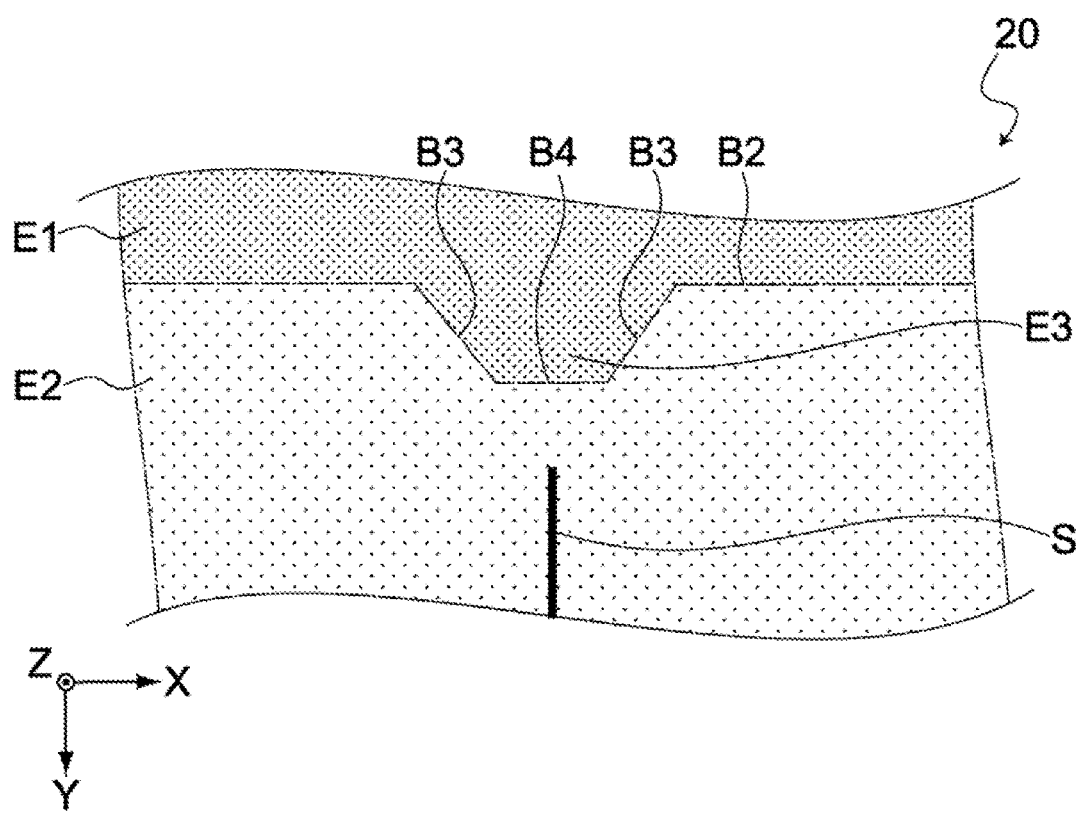
FIG. 13 is an enlarged view, from one direction, of the projecting area provided in an electric storage cell pertaining to still another embodiment of the present invention.

FIG. 11 is a cross sectional view of the covering films 20 pertaining to a variation example, while FIGS. 12 and 13 are each an enlarged view, from the Z direction, of the projecting area E3 pertaining to a variation example. Although the electric storage cell 10 in the aforementioned embodiment is such that the housing space R is sealed by the covering film package constituted by the two covering films 20, this is not always the case. As shown in FIG. 11, the electric storage cell 10 may be constituted in such a way that the housing space R is sealed by a covering film package which is formed by bending one covering film 20 around an electric storage element 30 and then sealing the three sides.

Also, while there is only one slit S in the aforementioned embodiment, this is not always the case and, as shown in FIG. 12, multiple slits may be provided between the projecting area E3 and the electric storage element 30. This improves the certainty that the internal pressure of the housing space R that has risen due to an abnormality of the electric storage cell 10 will be released through the slit S.

Furthermore, while the slit S in the aforementioned embodiment is provided in parallel with the boundary B4, this is not always the case and, as shown in FIG. 13, it may be provided orthogonal to the boundary B4.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-167666, filed Aug. 30, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electric storage cell having:
an electric storage element; and
a covering film package that houses the electric storage element and comprises a covering film having an upper portion and a lower portion which have a seal area where the upper and lower portions of the covering film are sealed around a periphery of the electric storage element to form a closed space for accommodating the electric storage element therebetween, said covering film comprising:
a metal layer having a first principle face on an electric storage element side and a second principle face on an opposite side of the first principle face,
an internal resin layer made of synthetic resin and laminated to the first principle face, wherein each of the upper and lower portions has the internal resin layer, and the internal resin layers of the upper and lower portions are in contact with each other in a contact area including the seal area around the periphery of the electric storage element, and
an external resin layer made of synthetic resin and laminated to the second principle face, with a slit formed at least in the external resin layer,
wherein the seal area is formed by the internal resin layers thermally fused to each other in a manner remaining sealed when the slit opens when an internal pressure of the closed space rises, and the contact area further includes a non-seal area where the internal resin layers are contacting each other but are not sealed between the seal area and the electric storage element as viewed from above, wherein the seal area of the contact area has a projecting area that projects toward the electric storage element and penetrates into the non-seal area of the contact area as viewed from above, and the slit is provided in the non-seal area of the contact area between the projecting area and the electric storage element as viewed from above, and
the projecting area has a trapezoid shape defined by a bottom boundary, a top boundary, and two side boundaries connecting the bottom boundary and the top boundary, wherein the top boundary faces the slit and is shorter than the bottom boundary, and the side boundaries are slanted in a manner that the slit is positioned in the non-seal area of the contact area away from the top boundary toward the electric storage element in proximity to a point of intersection of figure lines extending from the two side boundaries as viewed from above.

2. An electric storage cell according to claim 1, wherein, of boundaries between the projecting area and the non-seal area, a boundary closest to the electric storage element is parallel with a longitudinal direction of the slit.

3. An electric storage cell according to claim 1, wherein the slit is formed, without penetrating the metal layer, to a depth of more than 0 μm but no more than 15 μm, measured as a distance from a bottom of the slit in the external resin layer to the second principle face.

4. An electric storage cell according to claim 1, wherein the internal resin layer is made of non-oriented cast polypropylene or polyethylene, and the external resin layer is made of at least one of polyethylene terephthalate and nylon.

5. A covering film that forms a housing space in which an electric storage element is housed, having an upper portion and a lower portion which have a seal area where the upper and lower portions of the covering film are sealed around a periphery of the electric storage element to form a closed space for accommodating the electric storage element therebetween, said covering film comprising:
a metal layer having a first principle face on an electric storage element side and a second principle face on an opposite side of the first principle face,
an internal resin layer made of synthetic resin and laminated to the first principle face, wherein each of the upper and lower portions has the internal resin layer, and the internal resin layers of the upper and lower portions are in contact with each other in a contact area including the seal area around the periphery of the electric storage element, and
an external resin layer made of synthetic resin and laminated to the second principle face, with a slit formed in the external resin layer,
wherein the seal area is formed by the internal resin layers thermally fused to each other in a manner remaining sealed when the slit opens when an internal pressure of the closed space rises, and the contact area further includes a non-seal area where the internal resin layers are contacting each other but are not sealed between the seal area and the electric storage element as viewed from above, wherein the seal area of the contact area has a projecting area that projects toward the electric storage element and penetrates into the non-seal area of the contact area as viewed from above, and the slit is provided in the non-seal area of the contact area between the projecting area and the electric storage element as viewed from above, and
the projecting area has a trapezoid shape defined by a bottom boundary, a top boundary, and two side boundaries connecting the bottom boundary and the top boundary, wherein the top boundary faces the slit and is shorter than the bottom boundary, and the side boundaries are slanted in a manner that the slit is positioned in the non-seal area of the contact area away from the top boundary toward the electric storage element in proximity to a point of intersection of figure lines extending from the two side boundaries as viewed from above.

6. An electric storage module constituted by multiple electric storage cells that are stacked on top of each other, wherein each of the electric storage cells is defined in claim 1.

7. An electric storage module according to claim 6, wherein the slit is formed in the contact area of each electric storage cell, and a pair of the electric storage cells are stacked in a way that the slits of the electric storage cells face each other.

8. An electric storage cell according to claim 1, wherein the slit is positioned between the top boundary and the point of intersection of the figure lines as viewed from above.

* * * * *